July 21, 1931.  S. H. WILLISTON  1,815,661
SIDE WALL SAMPLER
Filed July 17, 1925   2 Sheets-Sheet 1
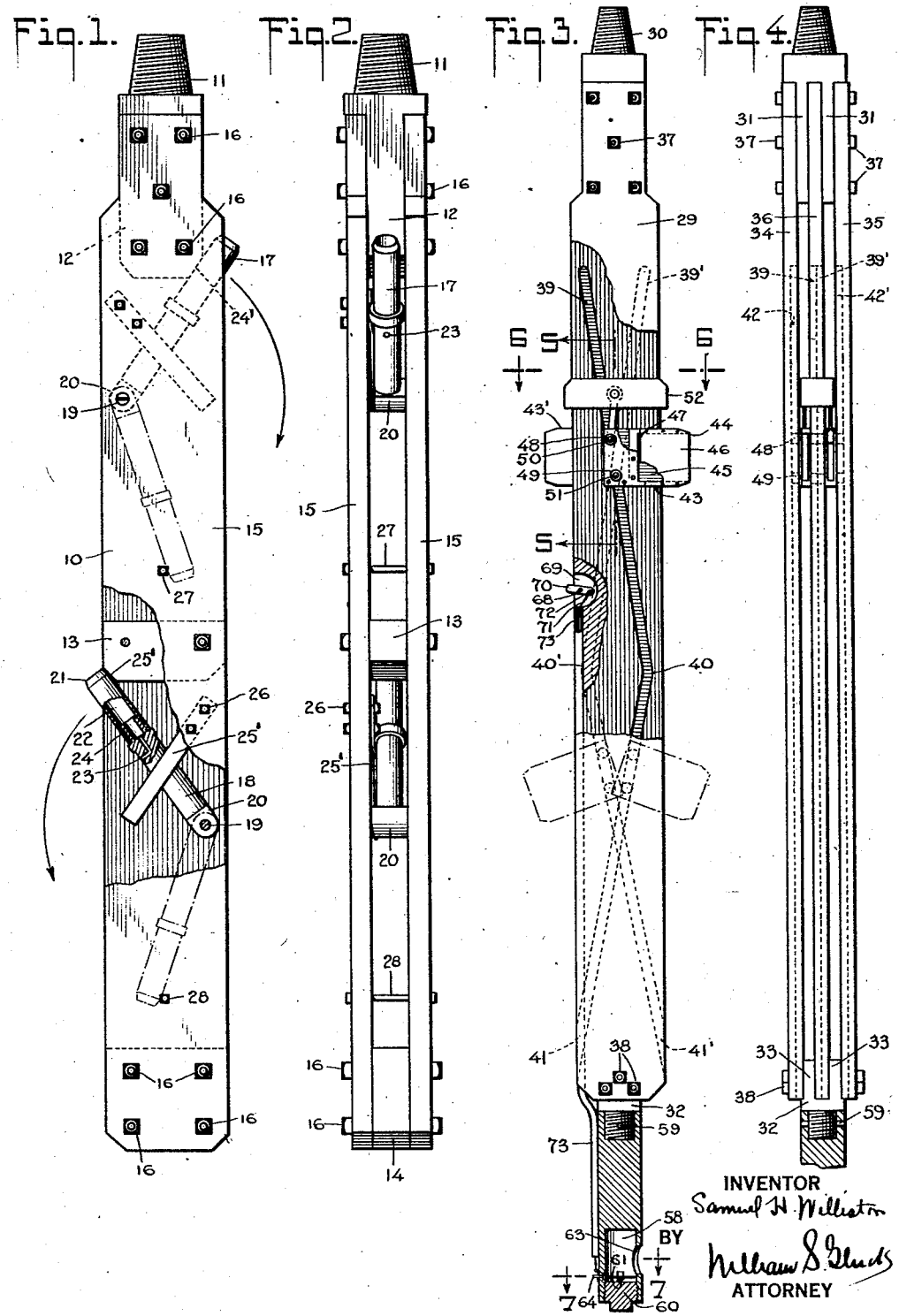

July 21, 1931.　　　S. H. WILLISTON　　　1,815,661
SIDE WALL SAMPLER
Filed July 17, 1925　　2 Sheets-Sheet 2
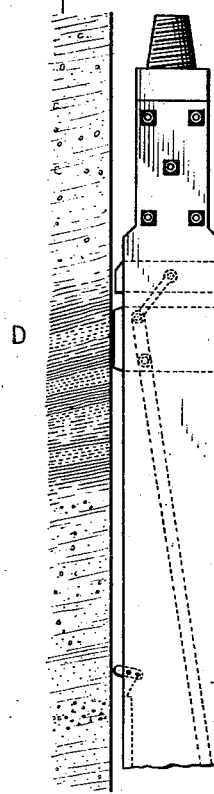
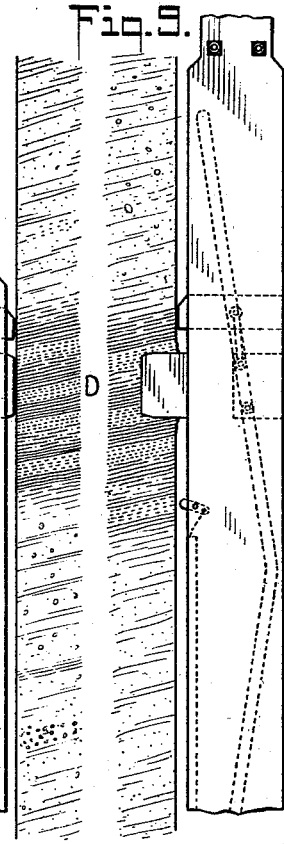
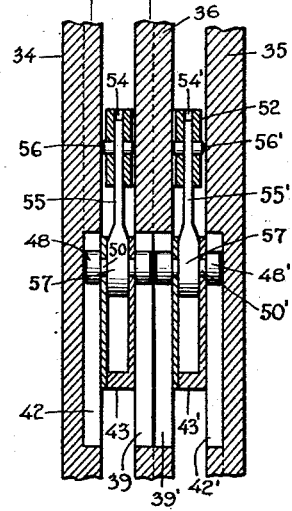
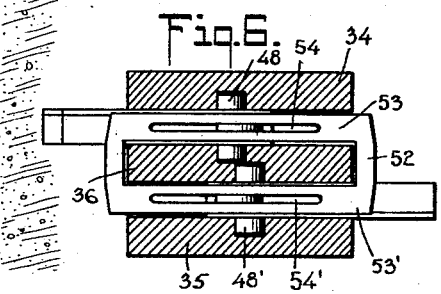
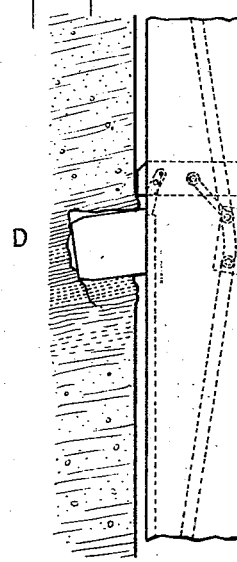
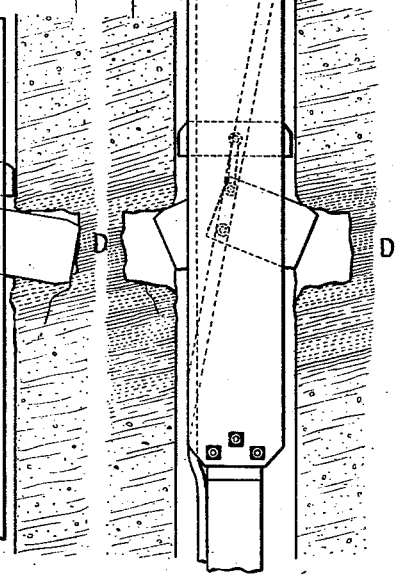
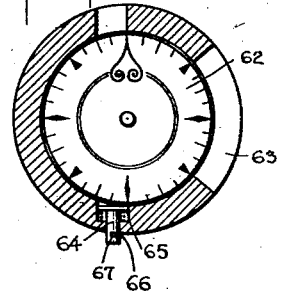
INVENTOR
Samuel H. Williston
BY
William S. Gluck
ATTORNEY Patented July 21, 1931

1,815,661

UNITED STATES PATENT OFFICE

SAMUEL H. WILLISTON, OF MARACAIBO, VENEZUELA, ASSIGNOR, BY MESNE ASSIGNMENTS, TO SPERRY-SUN WELL SURVEYING COMPANY, OF PHILADELPHIA, PENNSYLVANIA, A CORPORATION OF DELAWARE

SIDE WALL SAMPLER

Application filed July 17, 1925. Serial No. 44,155.

This invention relates generally to a device for taking samples of soil, rock, earth or the like, and more particularly to a device for sampling, which will indicate the structure of the earth's formation at different levels.

The invention has to do with certain improvements on the device set forth in my Patent No. 1,683,642, dated September 11, 1928.

My invention, therefore, has for one of its objects the provision of a sampler which will collect samples, which in themselves will indicate to the geologist the nature of the earth's structure and will therefrom guide him as to the best location for sinking a well, drill hole or the like, by collecting the same in a substantially undisturbed condition; the provision of a side wall sampler which is arranged to collect a sample from the side wall of the drill hole of the well or the like by a movement which merely is a change in direction from that needed to place the same in position; the provision of a sampler which has sample collecting members, each collecting samples of a nature that comparative studies thereof will show the dip and strike of the earth's formation by a single operation, which may be obtained at any predetermined level; the provision of a sample collecting device which will indicate the nature of the earth's structure by obtaining a sample in an undistubed condition and in the combination therewith of means for indicating the exact position the sample occupies in its original state of collection; the provision of a sample collecting device operated by the movement of the same within a drill hole by any connection therewith, such as a rope, so that by engagement with the said wall of the drill hole, a sample may be collected in an undisturbed condition by movement, such as a change in direction, said device being provided with means for causing penetration of the sample collecting member without disturbing the original soil structure and upon further movement causing disengagement of the sampler collecting means with the minimum amount of resistance, and in the combination therewith of means for indicating the exact relation of the sample collected to the drill hole; the provision of a sample collecting device which is arranged to penetrate the side wall of the drill hole or well and of the combination therewith of magnetic means, such as a compass operated by the movement of the sample collecting member so that by determination of the depth at which the sample was taken and the reading obtained on the direction indicating means or compass, the dip and strike of the surrounding soil may be obtained; the provision of a sampler and of direction indicating means combined therewith so that by collecting at random orientation multiple samples there may be determined, the dip and strike of the bed under construction; the provision of a sampler of the nature above described and providing samples which, when taken at random orientation from the same general horizon, will provide information from which the dip and strike of the beds may be determined.

The invention still further has for its object the provision of a sampler whose rotary tendency is prevented during the collection of a sample and the combination therewith of means to indicate the axial displacement at the time of the collection of the sample; the provision of a sampler having sample collecting means for penetrating the wall of the drill hole in various increments of penetration without disturbing the condition of the soil and of removing such sample in undisturbed condition; the provision of a side wall sampler provided with sample collecting means capable of penetrating the side wall of a drill hole by causing transverse movement of the sampler collecting means by relative longitudinal movement of the sampler and removing a sample of soil in an undisturbed condition; the provision of a side wall sampler comprising a body member arranged for longitudinal movement and a sampler for penetrating the side wall in a transverse direction to said body member; the provision of a side wall sampler having multiple sample collecting members having predetermined relation to each other and capable of collecting samples of soil by penetration of the side wall, said samplers being arranged for simultaneous penetrating action; the provision of a sampler arranged for movement within a wall cavity and capable of breaking off a sample and the combination therewith of magnetic direction indicating means to show the position of the sample at the time of collection.

For the attainment of these objects and such other objects as may appear herein or be hereinafter pointed out, I refer to the accompanying drawings forming a part hereof in which:

Fig. 1 is a partly broken side elevation of an embodiment of my invention,

Fig. 2 is an edge elevation of the view shown in Fig. 1,

Fig. 3 is a side elevation partly broken of a further embodiment of my invention, Fig. 4 is an edge elevation of my device as shown in Fig. 3, Fig. 5 is a section taken on line 5—5 of Fig. 3, Fig. 6 is a section taken on line 6—6 of Fig. 3, Fig. 7 is a section taken on line 7—7 of Fig. 3, Figs. 8, 9, 10 and 11 are side elevations of my device as shown in Fig. 3 in the various stages of operation; Fig. 8 being the view at the beginning of the operation and Fig. 11 showing the view at substantially the completion of the operation.

Upon viewing Fig. 1 of the drawings, it will be observed that there is shown a body or saddle member 10 having at its upper end a joint or rope socket connection 11 adapted to move the device, as by lowering or raising within the drill hole of the well. This member is preferably formed to include a spacer member 12 combining with the spacing blocks 13 and 14 of similar width to which the guides 15 are attached by means of bolts 16 extending through the several layers. Intermediate these spaced guides, I include a pair of sample collecting members 17 and 18 held in engagement with the body by pintles 19 passing through an eye or lug 20 on each collecting member. This sample collecting means is shown in the drawings as a tubular member of a length substantially greater than the width of the body 10. The member has a cutting portion 21 at the mouth of its tubular sample receiving portion 22 and has a liquid draining outlet 23 and excess release at the base thereof. The tubular members 17 and 18 are preferably screw-engaged with the body portion as shown at 24 to permit removal thereof.

The sample collecting members 17 and 18 are adapted to be swung upward to the position shown in Fig. 1 and made ready for operation. The members are positioned diagonally in an unbalanced position, the upward movement being limited by the blocks 12 and 13 respectively at the angular shoulder portions 24' and 25. The guides 15 may be provided with means to retain the members in this position (Fig. 1) until ready for operation; such means being a leaf spring 25' held by bolts 26 to bear against the body of the member and maintain it in the said upright position.

My device thus described operates similar to the device described in my above mentioned patent and may be briefly stated as follows: The sampler is permitted to move to the desired predetermined depth in the drill hole which is of substantially the same diameter as the full cross section of the sampler device thus permitting ready movement therein in the downward direction. Upon upward movement the projecting cutting ends 21 of the members will engage the side walls of the drill hole to cause a pivotal movement about the pintle 19 and simultaneously penetrating the side wall of the drill hole to cause a portion of the earth or soil collected to be forced into the hollow chamber 22. Thereupon after subsequent full penetration, the pivotal movement will cause the sample collecting means to recede to within the spaced walls of the body member to be completely received therein as shown in Fig. 1 in the dotted position.

Any water that may be collected in passing water veins or otherwise collected during descent, will be permitted to drain from the outlet 23 and thus insure that the chamber 22 is open for penetration purposes. Also any material that may be accidentally collected will be discharged from the outlet at full penetration assuring that the sample finally collected is from the desired level and no other.

Between the spaced members there is provided means to limit the downward pivotal movement of the sample collecting members 17 and 18 in the form of bolts running across the full width of the sampler body as shown at 27 and 28, permitting complete reception of said members within the spaced walls.

Upon withdrawal of this sampler from the drill hole the soil holding tubular collecting members 22 are disengaged from their respective body members by unscrewing the same. The tubular member thus disengaged then has its sample removed in a manner such as will be obvious by applying a plunger at one end thereof to force the contents thereof out, obtaining a sample in a condition in which it existed in the wall of the drill hole. By an examination of this sample and knowing the depth at which it was collected, determination may be made of the nature of the surrounding soil structure in a manner such as will be obvious by the skilled geologists.

In the view shown in Fig. 3 I have illustrated a further embodiment of my invention in which the body member 29 is provided at its upper end with a joint or rope socket connection 30 having bifurcated spacing blocks 31 combining with the lower spacer member 32 having bifurcated spacer blocks 33 upon which and between pairs of whose bifurcated portions are located the spaced longitudinal members 34 and 35 and central member 36.

These longitudinal members are held in relation to the bifurcated portions by suitable bolts 37 and 38. Upon observing Fig. 3 which has the longitudinal spaced member 34 broken away in part to disclose the central member 36, it will be observed that there is formed in its side wall a longitudinal groove 39 obliquely arranged on a longitudinal slant, preferably on a ratio of 8 to 1 towards the central portion 40. This groove is further extended, the oblique direction being reversed towards the opposite side at 41. For cooperation therewith the longitudinal member 34 has formed at its inner face a complemental groove 42 arranged similar to the groove 39.

For operation within the longitudinal members just mentioned there is provided a sample collecting member or cutter 43 which is preferably rectangular in construction having the cutting edge 44 at one end thereof forming the mouth of the chamber 45 which is preferably formed with a removable side wall 46 which is slightly short of the bottom of the chamber forming an outlet at 47. Opposite to the cutting edge of the sample collecting member there are arranged two pairs of rolls 48 and 49 turning on pins 50 and 51, passing through the rear portion of the cutters. These rolls are preferably arranged slightly staggered and are adapted to be received within the complemental grooves 39 and 42 in which position they are to ride maintaining the cutter at right angles (Fig. 3, 8 and 9) to the main longitudinal axis of the body member 29 by reason of the staggered relation of the pins when said rolls are in the upper portions of said grooves.

A cutter so arranged will maintain a horizontal position or a position at right angles to the body member when the cutter is in the extreme upper portion of the body member and engaging the groove 39, and will maintain the same up to the central position 40 whereupon, upon passing to a position below the point 40, a gradual tilting movement will be imparted to the cutter, at the same time giving it a receding movement within the body of the member, and at the extreme end of the groove 41 the cutter will be received entirely within the body portion. Although I may use a single cutter or sample collecting member, I prefer to use a duplicate cutter such as 43' equivalent in every respect to the cutter 43 but preferably disposed in reference to the cutter 45 in said body member in an opposite direction. For certain purposes however, a plurality of cutters may be used. For guiding this cutter, I provide on the longitudinal spaced members 35 and 36 complemental guiding grooves 39' and 42' arranged oppositely to the guiding grooves 39 and 42. It will be observed that these cutters 43 and 43' may act independent of each other, but in my preferred embodiment, these cutters are arranged for simultaneous action by connecting the same to an equalizing member 52, which as shown in Figs. 5 and 6, is in the shape of a collar encompassing the central longitudinal member 36. This collar has at the side members thereof 53 and 53' slots 54, 54' through which pass the links 55 and 55' respectively held in position by the pins 56 and 56'. The opposite end of the links is formed with lugs 57 which engage the pins 50 and 50' passing through the rear portions of the cutters 43 and 43' upon which are mounted the anti-frictional rolls previously mentioned. In this manner, the cutters or sample collecting members 43, 43' are adjoined for operation in unison.

For indicating the relative radial displacement of the sampler, I provide a compass, and in my preferred embodiment, this is in the form of a housing 58 arranged for screw engagement at the lower end of the spacer lug 32 having a screw plug 59. At the lower end of the housing for supporting the compass itself, I provide a support in the form of a plug 60, upon its upper central portion of which is provided a pivot or pin 61 for supporting the magnetic needle and dial 62. Just above the needle or dial 62 at one side of the housing 59 I provide a sight hole 63. To lock the compass or needle in any position, I provide a locking means in the form of a plunger 64 which is spring pressed by the helical spring 65 and is arranged for being held in the inoperative position by a pin 66 passing through the hole 67 and bearing against the outer wall of the housing 58 to prevent movement towards the inner portion of the housing. Withdrawal of this pin will cause the operation of this stop mechanism to lock the disc or compass against further movement. And for this purpose, preferably in the central longitudinal member 36, at a distance just above the central position 40 thereof, I provide a trigger 68 pivotally mounted within the slotted portion 69 normally adapted for having its outer portion 70 protrude beyond the end of the member 36 and having its inner portion 71 connected with a flexible member, such as a cord cable or wire 72, which is preferably led through a brass tube 73 housed within a groove in the central member and leading to the compass located at the lower extremity. The flexible member 72 is arranged for engagement with the pin 66 and fixedly engaged thereto.

The operation of this device will be obvious from the description as it proceeds. For obtaining a sample of a drill hole of a well in a vertical position, the sampler is connected to a rope, cable or rod by means of a tool or rope of the joint socket 11 and is then lowered into the drill hole and where the drill hole is of substantially the same size as the widest dimension of the sampler, frictional engagement will cause the same to assume a position at the outermost part of the groove 39 and 39' where two sets of cutters or sampler members are used. However, prior to use of the sampler, the cutters are caused to assume that position by movement to the uppermost position.

In Figs. 8, 9 and 10, I have illustrated my device in various steps in the operation of the same.

In Fig. 8 the sampler is shown at a position at which it is desired to obtain a sample designated at the depth D from the surface of the earth. The sampler is lowered into the drill hole until by predetermined calculation it is ascertained that the cutters 43, 43' will reach the depth D. Upon reversal of movement, the body member will continue upwardly, but by the frictional engagement of the cutters or of the equalizing member 52 with the side walls of the drill hole, the cutters will remain stationary. As upward movement of the body member proceeds by reason of the diagonal or oblique guide members 39 and 42 acting against the frictional rolls 48, a gradual transverse movement will be imparted to the cutters, at the same time maintaining positions parallel to itself throughout such action.

As transverse movement proceeds, for instance, as shown in Fig. 9, the side walls will penetrate the soil without disturbing the condition of the soil and merely forcing their way into the side wall of the drill and including within its confines a portion of soil, rock or the like, whichever may be found at that depth. As the upward movement of the sampler proceeds, full penetration will be reached at substantially the central portion 40 of the sampler. Thereafter, as the frictional roll reaches the re-direction portion of the groove between 40 and 41, a tilting movement will be given to the sample collecting member, serving to disengage the same from the soil and breaking off that portion of the soil included within its walls without disturbing the same. Further upward movement of the sampler will give the sampler further tilting movement, at the same time causing it to recede within the confines of the spaced longitudinal members 34, 35 and 36, and as shown in Fig. 11, practically complete reception is had. Further upward progressive movement will cause the sampler to be completely contained within the body of the sampler member.

It will be observed that upon penetration of the sample collecting member into the side wall of the well, that full penetration will not be prevented by providing the outlet 47, this outlet will permit a certain amount of the undesirable water or other material to escape and therefore permit full compacting of the soil within the walls of the collector member, particularly because the amount that will ordinarily be cut out is greater than the volume of the cutter and also by reason of the fact that some loose earth may have dropped into the chamber during its descent into the drill hole. This excess material thus accidentally scraped off will be the first material to be forced out of the outlet, thus assuring that the sample collected is the one actually desired and is not in any way contaminated by this accidentally collected material.

Where I desire to include direction indicating means of the sampler for indicating the radial displacement at the time the sample is taken, I include the compass and operating means previously described. For such purpose, the plunger of the locking mechanism (shown more clearly in Fig. 7), is pulled outwardly and to retain the same in its position, the pin 66 is inserted bearing against the side walls of the housing and preventing inward movement. The flexible member or cable 72 is attached to this pin so as to position the trigger 70 and cause a portion of it to project beyond the end face of the central longitudinal member 36.

Reverting back to Figs. 8, 9 and 10, it will be observed that as the sampler is moved upwardly in the well and the cutters engage in the side walls (shown more particularly in Fig. 9), further radial movement by the sampler will be prevented. Continued upward movement of the sample member will cause the same to move relative to the now stationary equalizing ring 52 which is linked to the cutter members 43, 43'. As the trigger portion 70 reaches the position occupied by the equalizing ring, it will be given a tilting movement by reason of the trigger striking the equalizing ring, pulling upon the flexible cable or wire and withdrawing the pin 66. At this moment, the plunger thus released will be forced inwardly by the helical spring 65 bearing against the dial or disc of the compass and lock the same in position, this position being retained when the sampler is removed from the drill hole. In this manner, a reading will be obtained from the compass indicating the position of the sampler collecting members 43 and 44 at the time that radial displacement is prevented by the engagement of the side walls with the drill hole, showing the magnetic location of the thin section which was moved to the position it occupied in its original state.

Thereafter, the cutter member 46 is removed from the sampler cut to disclose the insoil. As the sampler cut was retained in a horizontal position at the time the sample was taken, the angular displacement is then calculated by measuring the stratification of the soil to the top walls by suitable angle measuring devices. Thus by taking several samples at random orientation from the same general horizon in the well, the dip and strike may be calculated in a manner as will be obvious to the geologist.

It will also be obvious that from the particular depth and the dip and strike calculations thus obtained, the direction of the fold lines of the earth's strata will be easily ascertained to procure information suitable to the geologist for calculating the best location for sinking wells or for beginning other mining operations.

Having illustrated my invention and described its use, what I desire to claim and to secure by Letters Patent is:—

1. In a side wall sampler, a body, a sample collector mounted to slide in said body, and means for moving said collector laterally of the body to penetrate the soil to be sampled.

2. In a side wall sampler, a body having guides, a sample collector, and means engaging said guides and connected with said collector for moving said collector laterally to penetrate the soil to be sampled, when said collector is moved relatively of said guides.

3. In a side wall sampler, a body, a sample collector mounted to slide vertically and laterally of the body, and means for moving said collector laterally of said body to penetrate the soil to be sampled.

4. In a side wall sampler for well drill holes, a body having a guide extending longitudinally thereof and at an angle to the longitudinal axis of said body, and an earth sample collector movable in said body and engaging with said guides, whereby said collector will be moved laterally upon longitudinal movement of said body.

5. In a side wall sampler for well drill holes, a longitudinal body having an obliquely disposed guideway, and an earth sample collector mounted on said body and engaging with said guideway, whereby upon longitudinal movement of said body said collector will be moved laterally for penetrating the side wall of the well and collecting the sample.

6. In a side wall sampler for well drill holes, a longitudinal body having an obliquely disposed guideway, an earth sample collector mounted on said body and engaging with said guideway, whereby upon longitudinal movement of said body said collector will be moved laterally for penetrating the side wall of the well and collecting the sample, and means on the body for retracting the sample collector.

7. In a side wall sampler for well drill holes, a longitudinal body having an obliquely disposed guideway, an earth sample collector mounted on said body and engaging with said guideway, whereby upon longitudinal movement of said body said collector will be moved laterally for penetrating the side wall of the well and collecting the sample, and means on the body for retracting the sample collector upon continued movement of said body.

8. In a side wall sampler for well drill holes, an elongated body, a sample collector mounted to bodily move longitudinally and transversely of said body, and means on the body connected with the collector for moving said collector transversely, both outwardly and inwardly, upon a longitudinal movement of said body.

9. In a side wall sampler for well drill holes, an elongated body having a longitudinal guideway comprising upper and lower portions diverging from each other, and a sample collector slidable on the body and having engagement with said guideway, whereby said collector is moved transversely outwardly of the body while engaged with one portion of the guideway and is moved transversely and inwardly of the body when engaged with the divergent portion of said guideway.

10. In a side wall sampler for well drill holes, an elongated body having a divergent guideway, the portions of which are inclined with respect to the longitudinal axis of the body, a sample collector slidable on the body, and means carried by the collector and engaging in the guideway located to sustain the collector in a transverse position and to project it laterally of the body when said body is moved upwardly and while said means is traveling in the upper divergent portion of said guideway, said means acting to retract the collector when traveling in the lower divergent portion of the guideway.

11. In a side wall sampler for well drill holes, an elongated body having longitudinal openings, guideways in said openings of the body, the guideway of one opening being inclined oppositely to the guideway of the other opening, and oppositely directed sample collectors movable in said openings of the body and engaged with said guideways, whereby said collectors are moved laterally and in opposite directions upon longitudinal movement of said body.

12. In a side wall sampler for well drill holes, an elongated body having longitudinal openings, guideways in said openings of the body, the guideway of one opening being inclined oppositely to the guideway of the other opening, oppositely directed sample collectors movable in said openings of the body and engaged with said guideways, whereby said collectors are moved laterally and in opposite directions upon longitudinal movement of said body, and an equalizing member movable longitudinally of the body and positively connected with the collectors for causing relative uniform movement of the same.

13. In a side wall sampler for well drill holes, a body comprising a longitudinal guide member having elongated slots on each side thereof and provided with guideways in said slots, and sample collectors movable in said slots and having members engaging said guideways, whereby said collectors are guided laterally upon longitudinal movement of the body for penetrating the side wall of the well drill hole and removing samples therefrom.

14. In a side wall sampler for well drill holes, a body comprising a longitudinal guide member having elongated slots on each side thereof and provided with guideways in said slots, sample collectors movable in said slots and having members engaging said guideways, whereby said collectors are guided laterally upon longitudinal movement of the body for penetrating the side wall of the well drill hole and removing samples therefrom, and an equalizing element slidable on the longitudinal guide member and ties to the sample collectors for maintaining them in relative position.

15. In a side wall sampler for well drill holes, an elongated body provided with longitudinal separate slots, each having guides in its sides, each guide comprising divergent members and the divergent members in one slot being inclined oppositely to the corresponding diverging members in the other slot, sample collectors slidable in said slots of the body, and guide elements on the collectors engaging the guides for moving the collectors laterally in said slots upon longitudinal movement of the body, the collectors having cutters on their outer ends protruding from the body for penetrating the side wall of the well hole when said collectors are moved laterally, the guides being arranged to retract the cutters after penetration of said side wall.

16. In a side wall sampler, a body adapted to enter a bore hole, a sample collector mounted to move relatively to the body in a direction transverse to the direction of the axis of the bore hole to penetrate the soil to be sampled, and means carried by the body for imparting to the collector a transverse rectilinear component of motion relative to the body.

17. In a side wall sampler, a body adapted to enter a bore hole, a sample collector mounted to move relatively to the body in a direction transverse to the direction of the axis of the bore hole to penetrate the soil to be sampled, and means for so moving the collector and guiding it during such movement to maintain substantially constant its angular relationship to the soil during its penetrating movement.

18. In a side wall sampler, a body adapted to enter a bore hole, a sample collector mounted to move relatively to the body in a direction transverse to the direction of the axis of the bore hole to penetrate the soil to be sampled, and means for so moving the collector in substantially a straight line.

19. In a side wall sampler, a body adapted to enter a bore hole, a sample collector mounted to move relatively to the body in a direction transverse to the direction of the axis of the bore hole to penetrate the soil to be sampled, and means carried by the body for imparting to the collector a transverse rectilinear component of motion relative to the body, and for then withdrawing it from the soil.

20. In a side wall sampler, a body adapted to enter a bore hole, a sample collector mounted to move relatively to the body in a direction transverse to the direction of the axis of the bore hole to penetrate the soil to be sampled, and means for so moving the collector and guiding it during such movement to maintain substantially constant its angular relationship to the soil during its penetrating movement and for then withdrawing it from the soil.

21. In a side wall sampler, a body adapted to enter a bore hole, a sample collector mounted to move relatively to the body in a direction transverse to the direction of the axis of the bore hole to penetrate the soil to be sampled, and means for so moving the collector and guiding it during such movement to maintain substantially constant its angular relationship to the soil during its penetrating movement and for then changing its angular relationship to the soil and withdrawing it therefrom.

22. In a side wall sampler, a body adapted to enter a bore hole, a hollow sample collector having a soil penetrating open end and mounted to move relatively to the body in a direction transverse to the direction of the axis of the bore hole to penetrate the soil to be sampled, and means for so moving the collector in substantially a straight line in the direction of its open end.

23. In a side wall sampler, a body adapted to enter a bore hole, a hollow sample collector having a soil penetrating open end and mounted to move relatively to the body in a direction transverse to the direction of the axis of the bore hole to penetrate the soil to be sampled, and means for so moving the collector in substantially a straight line in the direction of its open end while it has substantially no movement of translation in the direction of the axis of the bore hole.

24. In a side wall sampler, a body adapted to enter a bore hole, a sample collector mounted to move in a direction transverse to the direction of the axis of the bore hole to penetrate the soil to be sampled, and means for so moving the collector in substantially a straight line while it has substantially no movement of translation in the direction of the axis of the bore hole.

25. In a side wall sampler, a body adapted to enter a bore hole, a sample collector mounted to move in a direction tranverse to the direction of the axis of the bore hole to penetrate the soil to be sampled, and means for so moving the collector while it has substantially no movement of translation in the direction of the axis of the bore hole.

In testimony whereof, I have hereunto signed my name this 30th day of June, 1925.

SAMUEL H. WILLISTON.